Aug. 1, 1933.  R. G. JEWELL  1,920,310
SIGNALING DEVICE
Filed July 18, 1928
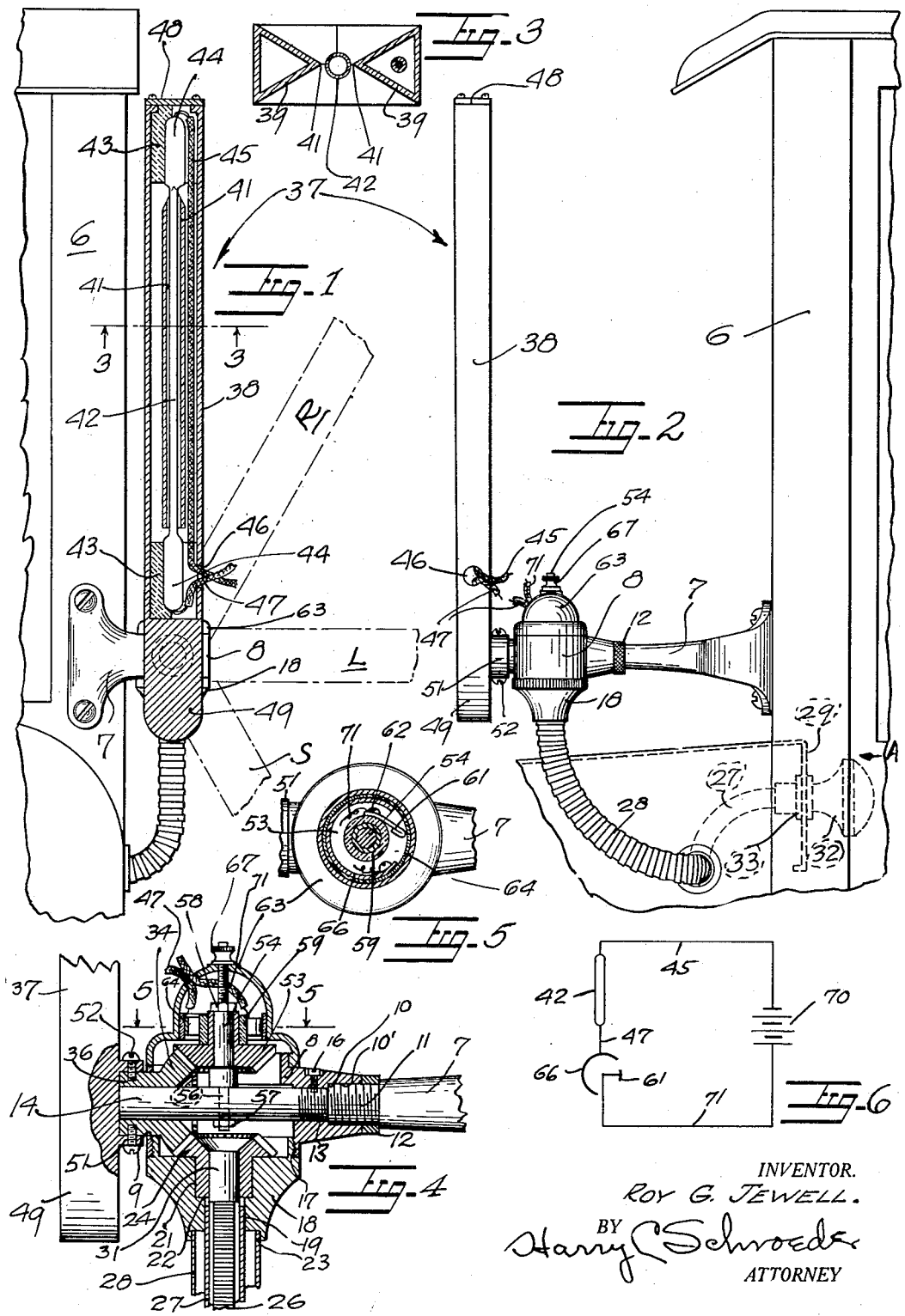
INVENTOR.
ROY G. JEWELL.
BY Harry C Schroeder
ATTORNEY Patented Aug. 1, 1933

1,920,310

UNITED STATES PATENT OFFICE 1,920,310

SIGNALING DEVICE

Roy G. Jewell, Oakland, Calif., assignor of one-half to Charles S. Chandler, Oakland, Calif.

Application July 18, 1928. Serial No. 293,607

2 Claims. (Cl. 116—54.)

The invention forming the subject matter of this application relates to a signaling device and particularly to the type of signaling device used on vehicles for indicating the intentions of the driver of the vehicle.

The primary object of the invention is the provision of a signaling device in which an arm is provided on the outside, on the driver's side of a vehicle, the arm being movable and the movement thereof being controlled by remote control from a convenient point inside of the vehicle and in which signaling device, the arm is rendered conspicuous by the use of a neon tube, extending the full length of said arm.

Another object of the invention is the provision of a signaling device, disposed outside of the vehicle, and which is controlled by convenient means from the inside of the vehicle, the turning of said device automatically lighting a neon tube extending in the arm of the device, the arm being so constructed as to reflect the light of the neon tube, both in the forward and rearward directions.

Another object of this invention is to provide a signaling device which is highly useful and simple in construction. Convenience of arrangement, lightness, and comparative inexpense of manufacture are further objects which have been borne in mind in the production and development of the invention.

In this specification and the annexed drawing, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the drawing:

Figure 1 is a front view of the device, showing the same attached to the front of a vehicle frame at one side of the windshield thereof;

Figure 2 is a side elevation of the device and a fragmentary view of a side elevation of a portion of the vehicle to which the device is attached;

Figure 3 is a sectional plan view of the signaling arm, the section being taken on the line 3—3 of Figure 1;

Figure 4 is a vertical section taken on the line 4—4 of Figure 1;

Figure 5 is a sectional plan view of the switch for connecting the light in the signal arm, the section being taken on the line 5—5 of Figure 4; and Figure 6 is a diagrammatic view showing the electrical connection of the device.

In carrying out my invention, I make use of a vehicle, such as a standard type of automotive vehicle, which has a front frame, denoted by the numeral 6, to which is attached a bracket, designated by the numeral 7, which bracket forms the support of my device. The bracket 7 extends forwardly from the frame member 6 and is curved toward one side so as to support a casing 8 at the outside of the driver's side of the windshield, as clearly shown in Figure 1. The casing 8 is open at the bottom and at the top thereof and is provided with an aperture 9 at one side thereof and with an aperture 10 adjacent to the bracket 7, the latter aperture being threaded, into which thread 10′ is secured a threaded end 11 of the bracket 7. A knurled lock nut 12 is provided for firmly holding the bracket 7 in place. The inner portion of the aperture 10 has a reduced threaded portion 13, into which is secured a shaft 14, held against rotation by means of a set screw 16. The shaft 14 extends beyond the opening 9 of the casing 8.

The bottom opening of the casing 8 is provided with inner threads, as at 17, into which is threaded a bushing 18 having an aperture 19 therethru, the upper end of said latter aperture being counterbored as at 21, so as to form a shoulder at 22. The lower end of the aperture 19 terminates in a shorter counterbore 23. In the counterbore 21 is rotatably disposed the shank of a bevel gear 24, rotatable in a horizontal plane. The rotation of the bevel gear 24 is accomplished by means of flexible shafting 26. Said flexible shafting is a pliant shaft, commonly used for such purposes, and is composed of a number of concentric spiral coils of wire, wound alternately right hand and left hand, over each other, thus giving flexibility when revolving as an ordinary shaft.

An inner flexible sleeve 27 is secured into the aperture 19 by pressing the same thereinto, the latter sleeve 27 being surrounded by an outer sleeve 28. The sleeves 27 and 28 are constructed out of concentric rings, so as to render the same flexible. As it is clearly shown in Figure 2, the sleeves are so bent as to extend thru the cowling of the vehicle and then extend thru the instrument board, denoted by the numeral 29. The flexible shafting 26 is rotatable inside of the inner sleeve 27. In order to effect an operative engagement between the bevel gear 24 and the flexible shafting 26, the end of the flexible shafting 26 is provided with a rigid stub shaft 31, pressed or otherwise secured into the shank of the bevel gear 24. The rotation of the flexible shaft 26 is accomplished by means of a knob 32, rotatably supported in the end of the sleeves 27 and 28 by suitable flanges 33 which also serve for securing the knob and the end of the sleeve upon the dash board 29.

It is apparent that by turning the knob 32, the rotation of the knob will be transmitted by the flexible shafting 26 to the bevel gear 24. A driven bevel gear 34 is disposed at right angles to the bevel gear 24 and is rotatable upon the free end of the fixed shaft 14. A shank 36 of the bevel gear 34 extends thru the aperture 9 and is rotatable therein. Upon the shank 36 of the bevel gear 34 is secured a signaling arm, denoted in its entirety by the numeral 37.

The signaling arm 37 comprises a frame 38, the upper end of which is constructed in the shape of two columns, reference character 39, each being of triangular cross section, as clearly shown in Figure 3. Each column 39 is hollow and is so disposed that the edges, reference character 41, thereof point toward the center of the frame 38. The adjacent edges 41 of the columns 39 are spaced sufficiently so as to allow the insertion of a neon tube 42 of the usual construction therebetween. At the opposite ends, the columns are united so as to provide a space for suitable packings 43 in which the usual enlarged bulb ends 44 of the neon tube are properly embedded. A conduit 45, connected to the upper end 44 of the neon tube 42, is disposed inside of one of the columns 39, so that it leads outside of the arm 37 thru an aperture 46, thru which aperture is also extended a conduit 47 connected to the lower bulb 44 of the neon tube 42.

After the neon tube is inserted between the columns 39, the top of the casing 38 is closed by means of a cover plate 48 secured to the casing by means of screws or other conventional means. The lower end of the casing 38 is formed in a solid block 49, having a hub 51 extending therefrom, which hub fits over the shank 36 of the gear 34 and is secured thereto by means of screws 52.

Now, when the knob 32 is turned, the turning movement thereof is transmitted to the gear 24 which, in turn, rotates the bevel gear 34, thus causing the arm to rotate therewith and assume any of the dotted line positions, indicated in Figure 1. According to the usual practice in vehicle traffic, a right hand turn is indicated by the position denoted by the character R, the left hand turn by the position designated by the character L, and the downward position indicated by S, is used in case of a stop signal.

In order to accomplish the lighting of the neon tube inside of the signaling arm 37 simultaneously with the turning thereof, I make use of a third bevel gear, denoted by the numeral 53. The bevel gear 53 is rotatable on a vertically positioned shaft 54, a reduced portion 56 of which extends thru the fixed shaft 14 and is secured thereinto by means of a lock nut 57; thus the bevel gear 53 rotates in a plane parallel with the plane of rotation of the bevel gear 24. In order to prevent the upward movement of the bevel gear 53, another lock nut 58 is provided on the shaft 54 above the shank of the bevel gear 53.

The shank of said bevel gear 53 is surrounded by an insulating ring 59, upon which is secured a resilient contact finger 61 by means of a screw 62. The contact finger 61 extends substantially tangentially to the insulating ring 59 and it tends to press against the inside periphery of a cap, designated by the numeral 63. The cap 63 is so shaped that it fits over the upper opening of the casing 8 and covers the same completely. The inside periphery of the cap opposite and concentric with the insulating ring 59 is covered with another insulating ring 64. A portion of the inside periphery of the insulating ring 64 carries a contact sector 66. The cap 63 is held in place upon the casing 8 by means of a nut 67, threadedly secured to the free end of the shaft 54, so as to press the cap 63 against the upper opening of the casing 8.

It is to be noted that when the arm is in the neutral position as shown in Figure 1, the contact plate 61 is positioned between the ends of the contact sector 66, so that the plate 61 contacts merely with the inside periphery of the insulating ring 64. Therefore, there is no current flowing thru the lamp, although the contact plate 61 is connected into the electric circuit. The contact sector 66 is connected to another terminal of the circuit so that when the knob 32 rotates the arm 37 into any of the dotted line positions shown in Figure 1, the bevel gear 53 will be also rotated, thereby rotating the contact plate 61 therewith until the same contacts with the sector 66, thus closing the electric circuit of the neon tube 42.

It is also to be noted that in order to turn the arm 37, the knob must be rotated in a clockwise direction, looking at Figure 2, from the direction of the arrow A. This will cause the rotation of the bevel gear 24 in a clockwise direction, viewing the device from the top. It is evident that this movement, when transmitted by the bevel gear 34 to the bevel gear 53, will rotate the latter gear in a counterclockwise direction, looking at Figure 5, thereby allowing the convenient contacting of the contact plate 61 with the sector 66.

The closing of the circuit will be effected immediately when the signal arm approaches its first position, and the switch remains closed thruout all the signaling positions of the arm 37. In the wiring diagram in Figure 6, (omitting the current transforming devices,) I show a battery 70, one terminal of which is connected through conduit 45 to one terminal of the neon tube 42, the other terminal of tube 42 being connected through conduit 47 to the contact sector 66. The contact plate 61 of the switch is connected to the other terminal of the battery 70 by means of conduit 71, so that when the contact plate 61 is in contact with the sector 66, the circuit is closed, through the conduit 47, tube 42, conduit 45, battery 70 and conduit 71.

It will be recognized that a particularly facile device is provided to accomplish the above described signaling by means of a neon tube, and the connecting of the neon tube at the proper movement of the signal arm, and one which combines light weight and sensitivity of movement and adjustment to different positions with a ruggedness of construction and positiveness of operation, especially adapting it for its use.

I claim:

1. Operating means for a signal arm comprising a housing adapted to be detachably secured to a bracket, a fixed shaft extending longitudinally through one end of said housing, a bevel gear rotatably mounted on a vertical axis in the lower portion of said housing, said lower portion being threadedly secured to the upper portion of said housing, a flexible shaft for rotating said bevel gear, and a second bevel gear rotatably mounted on said fixed shaft and meshing with said bevel gear, a hub on said second bevel gear, said hub extending through said housing and adapted for attachment of a signal arm thereto.

2. Operating means for a signal arm comprising a cylindrical housing adapted for attachment to a mounting bracket and consisting of an upper portion and a lower portion threadedly secured together, a driving bevel gear provided with a hub axially mounted in the lower portion of said housing, a mating bevel gear having the hub thereof projecting from the side of the upper portion of said housing and adapted for attachment of a signal arm thereon, a flexible shaft having one end fixedly secured to said driving bevel gear hub, the other end of said shaft having a knob secured thereon and rotatably mounted for rotational operation of said bevel gears for changing the position of the signal arm.

ROY G. JEWELL.